No. 734,239. PATENTED JULY 21, 1903.
F. M. PRATT.
PROCESS OF EXTRACTING OIL FROM COTTON SEED.
APPLICATION FILED JAN. 6, 1903.
NO MODEL.
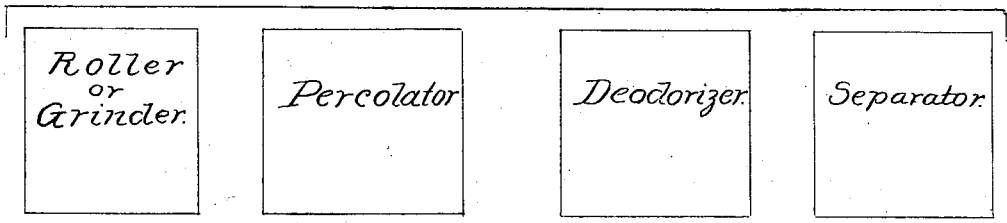
Witnesses.
Ina Graham.
Nora Graham.
Inventor,
Frank M. Pratt.
by L. P. Graham
his attorney.

No. 734,239. Patented July 21, 1903.

UNITED STATES PATENT OFFICE.

FRANK M. PRATT, OF DECATUR, ILLINOIS.

PROCESS OF EXTRACTING OIL FROM COTTON-SEED.

SPECIFICATION forming part of Letters Patent No. 734,239, dated July 21, 1903.

Application filed January 6, 1903. Serial No. 138,071. (No specimens.)

*To all whom it may concern:*

Be it known that I, FRANK M. PRATT, of the city of Decatur, county of Macon, and State of Illinois, have invented a certain new and useful Process of Extracting Oil from Cotton-Seed, of which the following is a specification.

This invention includes the use of a hydrocarbon solvent. It is based on the discovery that superior results may be obtained by treating the unhulled seed in a flattened or broken condition; and it consists in taking unhulled cotton-seed, with or without the lint thereon, rolling the seeds to flatten them or grinding them somewhat coarsely, and then treating them by a hydrocarbon solvent in a suitable percolator.

Ordinarily the extraction of the oil will be followed by a deodorizing operation, and in case the lint is not removed before beginning the process a final separating operation will be desirable for the purpose of getting the lint away from the seed. These steps are of secondary importance, however, and not entirely indispensable, as the seed from which oil has been extracted may have value without being deodorized and without being separated from its lint, and otherwise it is not impossible that the deodorizing and separating may constitute separate processes or steps in a different process.

The object of this invention is primarily to facilitate the extraction of the oil from cotton-seed and expedite subsequent steaming for deodorizing purposes, and, secondarily, to obtain the oil from the hulls as well as from the meat of the seed.

The first step in the process consists in flattening the unhulled grains out as thin as is practicable or in breaking the grains into separate parts, flattening being preferred. The next step consists in placing the flattened or broken grains into a suitable percolator and applying a hydrocarbon solvent thereto in the usual or in any suitable way. Subsequent to the extraction of the oil by means of the hydrocarbon solvent the seed will ordinarily be deodorized by the use of live steam, and after that any lint remaining mixed with the seed may be separated therefrom.

The hulls of the seed remain practically intact on the meat in case the grains are flattened, and they adhere to and commingle with the meat in case the grains are broken, so that the meat of each seed in the one case and of each piece of seed in the other case is separated more or less completely from every other seed or piece of seed by the intervening hull when a batch of seed is placed in the percolator. The mass in the percolator is composed of particles of meat through which particles of hull are regularly interspersed. The hull is tougher and more insoluble than the meat, and it makes the mass readily permeable by the solvent. Moreover, the hulls resist the softening action of the solvent to a greater extent than does the meat, and they prevent the particles of meat from cohering one to another to form an impermeable whole. In other words, the hulls assure a comparatively open, porous, or permeable mass at the beginning of the oil-extracting operation, and they resist the tendency of the solvent to destroy this condition.

After the oil has been extracted the permeable condition of the mass hereinbefore attributed to the hulls facilitates the deodorizing operation, and here again the toughness and insolubility of the hulls act against the formation of the sticky paste that might otherwise result from the commingling of the particles of meat.

If the lint or any part thereof is left adhering to the seed at the beginning of the process, it will add to the porosity of the mass and will also absorb the moisture, or a part thereof, which would have a detrimental effect on the result; but satisfactory results may be obtained if the lint is removed prior to beginning this mode of procedure.

If the grains are flattened, a set of rolls may be advantageously used, and if they are broken a grinding-mill of some kind will be needed. The percolator may be of the usual construction, as may also be the steamer or deodorizer and the separator for the lint in case the last-named appliance is used. Under some conditions the process may stop with the extraction of the oil, and in other instances the deodorizing may be done in the percolator. For these reasons a drawing can hardly add to the description of the process, and I have attempted nothing further than to show in a conventional or diagrammatic way the different appliances that may be used in the process. As each appliance is named on the drawing and as there is nothing about either to explain, a specific description thereof is needless. If the drawing is read from left to right, each appliance will appear in regular order.

The seed is flattened or broken to give the solvent and the deodorizing steam more complete access to the interior of the meat, and the degree of flattening or breaking may vary.

The lint may be removed from the hulls by applying pressure to the seeds sufficient to break the hulls into fine particles, and the operation will be facilitated by rubbing the seeds while the pressure is applied. The rubbing may be accomplished by moving one pressing-surface with relation to the other or by moving one surface faster than the other, as in differential rolls, or the disintegrating of the hulls may be accomplished by passing the seed between rolls one of which is roughened. The disintegration of the hulls detaches the hulls from the lint, and separation may be accomplished by a sifting process.

I claim—

1. The process of extracting oil from cotton-seed, which consists in disarranging the structure of the hulls and meat of unhulled and unlinted seeds, then treating the seeds in mass to the action of a hydrocarbon solvent, then deodorizing the seeds, and then separating the lint from the seed.

2. The process of extracting oil from cotton-seed, which consists in flattening unhulled and unlinted seeds, then treating the seeds in mass to the action of a hydrocarbon solvent, then deodorizing the seeds, and then separating the lint from the seed.

In testimony whereof I sign my name in the presence of two subscribing witnesses.

FRANK M. PRATT.

Witnesses:
SEYMOUR CAMPBELL,
CLEM ERISMAN.